United States Patent [19]

Morstadt

[11] 3,803,360

[45] Apr. 9, 1974

[54] SWITCHING APPARATUS FOR CONNECTING A DATA TERMINAL TO A PLURALITY OF COMMUNICATIONS NETWORKS

[75] Inventor: Richard A. Morstadt, Elmhurst, Ill.

[73] Assignee: GTE Automatic Electric Laboratories Incorporated, Northlake, Ill.

[22] Filed: June 2, 1972

[21] Appl. No.: 259,182

[52] U.S. Cl. .............................. 179/2 DP, 179/6 R

[51] Int. Cl. .............................. H04m 11/06

[58] Field of Search .......... 179/2 DP, 2 R, 6 E, 6 R, 179/27 D, 27 FH, 81, 99

[56] References Cited

UNITED STATES PATENTS

| | | | |
|---|---|---|---|
| 3,691,310 | 9/1972 | Fenton | 179/99 |
| 3,701,854 | 10/1972 | Fenton | 179/99 |
| 3,701,855 | 10/1972 | Reynolds | 179/99 |
| 3,733,442 | 5/1973 | Yook Foo Lee | 179/99 |
| 3,539,732 | 11/1970 | Weissenberg | 179/99 |
| 3,193,620 | 7/1965 | Marheine | 179/6 E |
| 3,679,831 | 7/1972 | Bonsky | 179/6 E |
| 3,665,107 | 5/1972 | Kopec | 179/2 DP |
| 2,945,917 | 7/1960 | Clark | 179/27 D |

*Primary Examiner*—Kathleen H. Claffy
*Assistant Examiner*—Thomas D'Amico
*Attorney, Agent, or Firm*—Robert J. Black

[57] ABSTRACT

An apparatus permitting automatic call answering by a single data terminal having access to two telecommunication networks. Provision is also included for automatic call origination on either of the two networks.

5 Claims, 2 Drawing Figures

SWITCHING APPARATUS FOR CONNECTING A DATA TERMINAL TO A PLURALITY OF COMMUNICATIONS NETWORKS

BACKGROUND OF THE INVENTION

1. Field of the invention

Line transfer circuits are widely used in the telephone industry. Such transfer circuits typically employ keys manually operated to select a desired outgoing line of a group that may be connected to a single terminal device and may further include signaling lamps or other devices to indicate an incoming call to the station. Upon recognition that an incoming call is present, a connection to the line carrying the incoming call is again made by manual means. However, with the advent of data transmission over both public switched networks and special service networks and the inclusion of such sophisticated techniques as automatic call origination and automatic call answering in data transmission terminal devices, a need is present for a line transfer circuit that is compatible with and fully utilizes the features of such data terminal devices.

SUMMARY OF THE INVENTION

Accordingly it is the object of the present invention to provide apparatus for connecting a data terminal incorporating automatic call answering and automatic call origination to a plurality of telecommunication lines. More specifically it is the object of the present invention to permit a data terminal having access to at least two telecommunication lines to answer automatically that line carrying an incoming call, while excluding the other line. Another object is to permit a data terminal to selectively access one of a plurality of telecommunication lines in accordance with data information to be transmitted to the selected telecommunication line for fully automatic call origination.

Briefly these and other objects of the present invention are realized in a specific illustrative embodiment of the present invention described herewith. The present invention permits access to at least two switched telecommunication network lines. These lines may be public switched network lines or special service lines and/or private network lines exhibiting operational characteristics similar to those of the public switched network. The circuit of the present invention operates under the control of a data terminal and the telecommunication lines, and permits automatic call origination and automatic call answering on either of the two lines. The present circuit also provides means for attenuating signals on one line for application where loss characteristics of the telecommunication networks' local loops differ significantly Visual indicating means are provided to show operational status.

More specifically, incoming calls on either of the telecommunication lines are recognized by sensing devices which effectively operate appropriate circuitry to connect one telecommunication line and disconnect the other from the data terminal. In the case of call origination, a signal indicating the appropriate channel over which transmission is to be effected is generated at the data terminal and by means of the present invention, connection to the appropriate line for outgoing transmission is effected. Visual indication of the line in use is provided as well as a visual indication of an incoming call on an unconnected line.

BRIEF DESCRIPTION OF THE DRAWINGS

In FIGS. 1 and 2 relay contacts are shown detached from their associated relay winding. Contacts which are closed when the associated relay is de-energized are known as "break contacts" and are represented by single shortline perpendicular to the conductor line. Contacts which are closed when the associated relay is operated are known as "make contacts" and are represented by two short lines diagonally intersecting the conductor. Each set of relay contacts is identified by an alphabetic designation similar to that of its associated relay coil as well as an individual and specific numerical designation.

DESCRIPTION OF A PREFERRED EMBODIMENT

Figure 1:
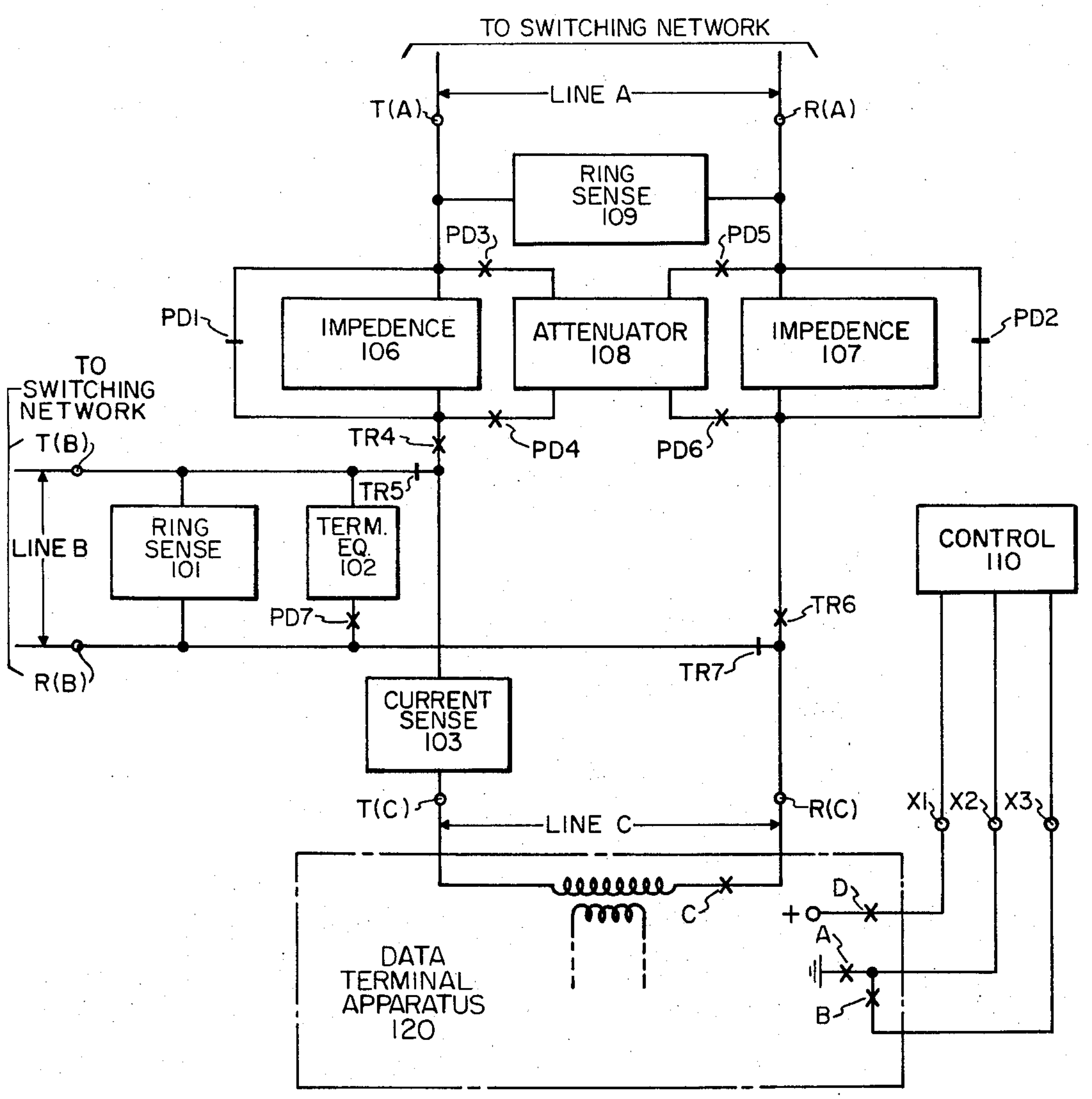
FIG. 1 is a block diagram showing a data terminal apparatus and two telecommunication network lines as well as switching apparatus connected therebetween in accordance with the present invention.

Referring first to FIG. 1 two switched network lines, line A and line B, are shown connected to the present invention. Each line consists of two conductors T (tip) and R (ring). Additionally a line from the data terminal apparatus 120 designated line C is presented to the present device. In addition three extra conductors between the data terminal apparatus 120 and the present invention are connected at terminals X1, X2 and X3. These conductors carry control information between the data terminal apparatus 120 and the present switching circuit. Lines A and C or lines B and C effectively carry information between the selected communication switching network and the data terminal apparatus 120.

While the present data terminal apparatus 120 does not form a pair of the present invention some reference to its component portions should be made at this time. Typically speaking a data terminal apparatus for use with the present invention might well include a business machine, i.e., digital computer, etc., a data set such as that manufactured by GTE Automatic Electric Company and designated AE101C, an automatic dialing device such as that manufactured by Western Electric and designated WE801C and manually or automatically operated line selection equipment to operate the contacts shown as contacts A and B within the terminal apparatus 120 for control signals over the conductors extending to terminals X2 and X3 leading to control apparatus 110. In the data set specified above, battery potential is available through a contact designated D to indicate when the terminal apparatus is in the data transmission mode. This signal is applied via the conductor extending to terminal X1 and then to the control apparatus 110 of the present invention.

Assuming now a call is received at line B via the switched network, a ringing signal will be present across terminals T(B) and R(B). This ringing signal is typically 65 to 120 volt RMS, 16 to 20 Hertz sinusoidal signal. This signal causes the associated ring sense circuit 101 to respond, causing operation of control unit 110. The ringing signal passes through transfer contacts TR5 and TR7 which are unoperated at this time, through current sensing means 103 to terminals T(C) and R(C) of line C. Since the data terminal apparatus 120 is arranged to automatically answer the call, the incoming ringing signal will be sensed and a switching contact C will be automatically operated. This will cause network current to flow from line B through line C and the terminal apparatus, resulting in operation of current sense circuit 103. It will also cause removal of the network ring signal and subsequent connection to the calling party via line B.

Typically, after a quiet period (after line seizure) the called data terminal apparatus achieves the data mode of operation and transmits a signal to the calling station to disable network echo suppressors, as notification of its state of readiness, or as an essential part of the supervisory signal exchange like that shown in U.S. Pat. RE 26099. At the completion of this assurance signaling, the data terminal apparatus exchanges information with the calling station. At the end of the information exchange the terminal apparatus removes the low DC resistance (for example by opening contacts C) from between conductors T(C) and R(C) of line C. As a result DC current stops flowing over lines B and C, causing the current sensing means 103 to release and the network to return to its quiescent condition.

Assuming now that a call is received at line A, and a ringing signal is presented across terminals T(A) and R(A), the signal causes ring sense circuit 109 to respond and act on control means 110 resulting in the operation of transfer relay contacts TR4, TR5, TR6 and TR7 which effectively disconnect line B from its normal connection to line C and replace it with connection of line A to line C. The ringing signal is now further conducted around impedance means 106 and 107 by relay contacts PD1 and PD2 and through contacts TR4 and TR6 to the terminals of line C and thence to the data terminal apparatus 120. The incoming ringing signal acts on the terminal device in the manner previously described with one additional facet.

As the terminal device achieves the data mode of operation, it places a signal at contact D on the conductor extending via terminal X1 to control circuit 110. At circuit 110 it will cause operation of relay PD which forms a portion of the control circuit 110 as shown in detail in FIG. 2. The operation of relay PD removes the low impedance path from around impedance means 106 and 107 and connects attenuator circuit 108 across the impedance means. Thus as the terminal device achieves the data mode of operation the attenuator 108 is placed in the transmission path. At the same time termination equipment 102 is placed by means of operation of contact PD7 across line B in order to render line B "busy" to incoming calls, while the terminal device is connected to line A. In a manner previously described the data terminal apparatus 120 is now connected to the switched network, line A.

Consider now the origination of a call from the terminal apparatus 120. By either manual selection means or by means of programming associated with the business machine that forms a portion of the data terminal apparatus, the line A or line B will be selected by operating contacts A or B included in data terminal apparatus 120 respectively. The ground on contact A or a loop connection at contact B are extended via terminals X2 and X3 to control circuit 110. Operation of contact A will cause the transfer relay included in control circuit 110 to operate with associated operation of transfer contacts TR4, TR5, TR6 and TR7 respectively which are effective to disconnect line B from the data terminal apparatus and connect line A. Operation of contact B within the data terminal apparatus 120 assures that the transfer relay included in control 110 will not operate. The selected line will be seized by operation of contact C. At this point dialing either by means of an included automatic dialer or by manual operation takes place over the selected line. Upon reaching the called station, the call proceeds as previously described with the answering station typically initiating a tone exchange. Note that if a call is placed on line A attenuator 108 is placed in the transmission path when the terminal device achieves the data mode of operation (that is to say that after the dial and call establishment processes are completed).

Figure 2:
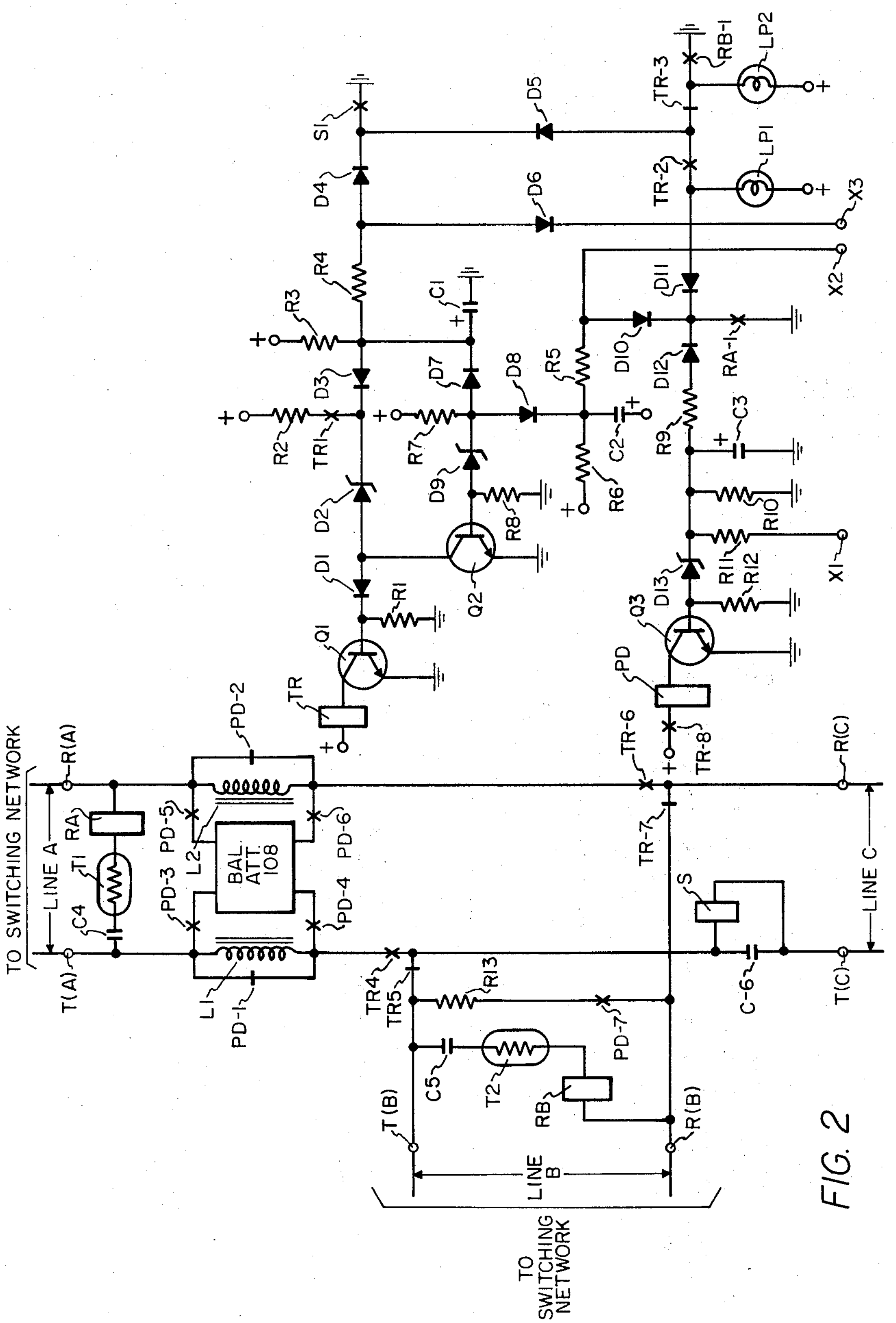
FIG. 2 is a schematic diagram showing in detail the circuitry of the present invention.

Referring now to FIG. 2. For a better understanding of the present invention a review of the detailed circuitry in operating the present invention will be presented. Initially a ringing signal received over line A will cause operation of the ring sense circuitry. While the ring sense circuitry can assume any well known form, for purposes of explanation the configuration such as shown is assumed. Capacitor C4 blocks DC line current and couples the AC ringing current to thermistor T1 and relay RA. The flow of AC current through thermistor T1 causes it to heat and eventually reduce its internal resistance to a point where relay RA operates during a portion of each half cycle of the ringing signal.

At its associated contact RA-1, RA in response to ringing will cause capacitor C2 to charge rapidly through resistor R5, diode D10 and ground extended through contact RA-1. The voltage at the junction of resistor R7 and Zener diode D9 is lowered below the threshold of Zener diode D9, stopping the current flow to the base of switching transistor Q2, causing transistor Q2 to turn off. If the S1 contact associated with the sense circuit relay S is not operated (i.e., line B is not seized), no current flows from resistor R3 through resistor R4, diode D4 and contact S1, and the voltage at the junction of resistor R3 and diode D3 remains high enough to cause current to flow through diodes D1, D2 and D3 and switching transistor Q1, causing transistor Q1 to turn on.

As transistor Q1 turns on, the transfer relay TR operates and the ringing signal that appeared between terminals T(A) and R(A) of line A is conducted to terminals T(C) and R(C) of line C. The presence of the ringing signal on line C causes the terminal device to automatically answer the call.

As described previously, answering the call will cause a DC current flow through both lineS A and C and will cause current sensing relay S to respond, after which ringing signals will be removed at the central office in the usual manner conventional to telephone systems and the connection will be completed to the calling party. Operation of the current sensing relay S which is connected in parallel with an audio-frequency coupling capacitor C6, operates S1 contact associated with relay S to cause current to flow from the source of battery potential through resistor R3, resistor R4, diode D4 and through operated contact S1 to ground and also through the path from battery through resistor R7, diode D7, resistor R4, diode D4 and the S1 contact thereby lowering the voltages at the junction of resistor R3 and diode D3 and the junction of resistor R7 and diode D9, to a level below the threshold of Zener diodes D2 and D9 respectively. Switching transistor Q2 remains off and the TR relay will hold itself operated over a path extending from battery through resistor R2, operated contact TR1, Zener diode D2, diode D1 and transistor Q1.

When the terminal device achieves the data mode of operation as noted previously it will place an indication (battery) on the lead extending to terminal X1 of the present invention. The current from this source of potential is conducted through resistor R11 and Zener diode D13 to switching transistor Q3. Transistor Q3 turns on, thus causing relay PD to operate. Break contacts PD1 and PD2 associated with relay PD remove the low impedance paths around impedances L1 and L2 respectively, and insert the balanced attenuator 108 into the circuit by means of operation of contacts PD3, PD4, PD5 and PD6. Impedances L1 and L2 offer a very high impedance to audio frequency range signals and low resistance to DC current. The balanced attenuator 108 is a balanced, variable loss, matched impedance attenuator.

Resistor T10, capacitor C3, resistor R9, diode D12 and contact RA-1 act to prohibit the insertion of the attenuator into the transmission path by keeping transistor Q3 off during the presence of ring on line A. The operation of relay PD at its contact PD7 causes the termination means R13 to be placed across the conductors of line B, rendering it busy to incoming calls while activity continues on line A.

At the end of the call on line A, the data terminal opens the DC path between the conductors of line C causing relay S to release and contact S1 to open. Capacitor C1 which serves to suppress the effect of a momentary opening of contact S1 is charged through resistors R3 and R7. Capacitor C2 which permits the TR relay to remain operated during the "quiet period" of the ring cycle, was previously discharged through resistor R6 during the call. Thus the voltage at the junction of resistor R7 and Zener diode D9 increases to the threshold of Zener diode D9 permitting current to flow to transistor Q2 with its subsequent operation. As transistor Q2 operates, transistor Q1 is made to turn off, releasing relay TR and disconnecting line A from the data terminal. Upon "hanging up" the data terminal also removes the potential at its contact D that indicated data mode operation. Thus the voltage is removed from that conductor extending through terminal X1 to the control circuitry of the present invention, and transistor Q3 will be turned off, releasing PD. The circuit of the present invention is thus returned to its quiescent state ready to receive or originate a call on either line, A or B.

When a call is received over line B, the ring signal will cause relay RB to operate with a resultant closing of contact RB-1 on each half cycle of the ring signal causing lamp LP2 to flash, giving a visual indication of the presence of a ringing signal on line B. Since relay TR is not operated, the ring signal will be applied directly to line C causing the data terminal to automatically answer the call. In the manner previously described, answering the call will cause relay S to operate. Closing of associated contact S1 will cause lamp LP2 to light steadily as a result of current flowing through lamp LP2, break contact TR3 of relay Tr, diode D5, and sense relay contact S1 to ground.

If a call is received on line A while operation continues on line B, relay RA will respond to the ringing signal causing lamp LP1 to flash by alternating conducting and not conducting current through lamp LP1, diode D11 and contact RA-1.

A line transfer will not take place as long as activity continues on line B keeping relay S operated and its associated contacts S1 closed. The operation of contacts S1 prohibits the voltage at the junction of diode D2 and D3 from reaching the threshold of Zener diode D2 and thus does not permit transistor Q1 and the associated TR relay to operate. If the call on line B is terminated and ringing is present on line A, contact S1 will open, permitting the operation of relay TR, and the ringing signal from line A will then be applied to the data terminal apparatus.

Restricting the operation to one of the two lines requires action by the data terminal apparatus over those leads extending to terminals X2 and X3. A signal ground at terminal X2, for example, by means of operation of contact A at the data terminal apparatus will restrict the operation (both call originating and call answering) of the present invention to lines A. If a call is in progress on line B when the signal ground is connected to the lead extended at terminal X2, no operational changes take place until the call is terminated. When operation on line B is completed the relay TR will operate and thereafter permit operation only on line A until the signal ground is removed. Connecting the leads extended to terminals X2 and X3 at the data terminal, for example, by means of operation of contact B will restrict operation to line B. If the lead connected to terminal X2 is not connected to either signal ground or to terminal X3, the circuit of the present invention is conditioned to transfer the ring signal from either line to the data terminal apparatus.

While but a single embodiment of the present invention has been described, it will be obvious to those skilled in the art that numerous modifications can be made without departing from the spirit and scope of the present invention, which is limited only by the scope of the claims appended hereto.

What is claimed is:

1. Switching means adapted for connecting a first and a second communication line to a data terminal equipped to automatically answer incoming messages received over said lines, said switching means comprising: transfer means connecting said first line to said data terminal and operable to disconnect said first line from said data terminal and connect said second line to said data terminal; first signal detection means connected to said first line; second signal detection means connected to said second line; control means connected to said first and second detection means and to said transfer means, said control means operated in response to detection by said second signal detecting means of ringing signals on said second line to operate said transfer means; whereby said second line is connected to said data terminal and said first line is disconnected from said data terminal; said control means further operated in response to said data terminal being operated in a first call originating mode, to inhibit operation of said transfer means whereby said data terminal may originate an outgoing call over said first line; said control means yet further operated in response to said data terminal being operated in a second call originating mode to operate said transfer means, whereby said data terminal may originate an outgoing call over said second line; said switching means further including attenuation means connectible between said second line and said data terminal; and circuit connections between said control means and said attenuation means; said control means operated in response to connection of said second line to said data terminal and said terminal operated in the data mode, to connect said attenuation means between said second line and said data terminal.

2. Switching means as claimed in claim 1 wherein: there is further included, sensing means connected between said telephone lines and said data terminal, and including a circuit connection to said control means; said sensing means operated in response to said data terminal automatically answering an incoming meassage received over one of said lines, to further operate said visual indicating means associated with said line conducting said incoming message, on a continuous basis.

3. Switching means as claimed in claim 2 wherein: said operated sensing means, inhibits operation of said control means to transfer said data terminal to a first one of said incoming lines receiving an incoming message, when said other line is conducting an incoming message to said data terminal.

4. Switching means as claimed in claim 2 wherein: completion of an incoming call over one of said lines connected to said data terminal deactivates said sensing means, said deactivation permitting further operation of said control means to transfer said data terminal to the other of said lines.

5. Switching means as claimed in claim 1 wherein: there is further included termination means; said termination means connected to said first line in response to operation of said control means.

* * * * *